United States Patent
Patel et al.

(10) Patent No.: US 6,314,284 B1
(45) Date of Patent: Nov. 6, 2001

(54) SYSTEM AND METHOD FOR PROVIDING SERVICE TRANSPARENCY FOR MOBILE TERMINATING CALLS WITHIN AN H.323 SYSTEM

(75) Inventors: Mahesh Patel; Subrata Mukherjee, both of Plano, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/223,205

(22) Filed: Dec. 30, 1998

(51) Int. Cl.$^7$ ............................. H04M 3/42; H04Q 7/20

(52) U.S. Cl. ..................... 455/417; 455/432; 455/445; 455/461

(58) Field of Search ..................... 455/417, 554, 455/555, 461, 432, 433, 445; 379/210, 211, 212

(56) References Cited

U.S. PATENT DOCUMENTS

| | | | | |
|---|---|---|---|---|
| 5,655,001 | * | 8/1997 | Cline et al. ............................. | 370/328 |
| 5,734,700 | * | 3/1998 | Hauser et al. ........................ | 455/413 |
| 5,862,481 | * | 1/1999 | Kulkarni et al. ...................... | 455/432 |
| 5,924,030 | * | 7/1999 | Rautiola et al. ...................... | 455/426 |
| 5,953,663 | * | 9/1999 | Maupin et al. ....................... | 455/433 |
| 5,978,672 | * | 11/1999 | Hartmaier et al. .................... | 455/413 |
| 6,014,377 | * | 1/2000 | Gillespie .............................. | 370/351 |
| 6,018,737 | * | 1/2000 | Shah et al. ............................. | 707/10 |
| 6,067,529 | * | 5/2000 | Ray et al. ............................... | 705/26 |
| 6,112,084 | * | 8/2000 | Sicher et al. .......................... | 455/426 |
| 6,128,304 | * | 10/2000 | Gardell et al. ........................ | 370/401 |
| 6,161,008 | * | 12/2000 | Lee et al. ............................... | 455/414 |
| 6,175,622 | * | 1/2001 | Chiniwala et al. ................... | 379/211 |
| 6,185,288 | * | 2/2001 | Wong ..................................... | 379/219 |
| 6,208,854 | * | 3/2001 | Roberts et al. ....................... | 455/417 |

FOREIGN PATENT DOCUMENTS

| | | | | |
|---|---|---|---|---|
| 0987870 | * | 3/2000 | (EP) | ............................... H04M/1/72 |
| 98/17048 | * | 4/1998 | (WO) | .............................. H04M/3/50 |

OTHER PUBLICATIONS

Olle Granberg; "GSM on the Net", Ericsson, Stockholm, Sweden; Ericsson Review No. 4; 1998; pp. 184–191.

Martine Alverhne and David Barnes; "GSM Services and Facilities for the User"; Proceedings of the Nordic Seminar on Digital Land Mobile Radio Communications, Helsinki, Finland; vol. Seminar 4; 1990; pp. 15101–15112.

Gary A. Thom; "H.323: The Multimedia Communications Standard for Local Area Networks"; IEEE Communications Magazine, Piscataway, N.J.; vol. 34, No. 12; Dec. 1, 1996; pp. 52–56.

PCT International Search Report; PCT/US99/30922: May 10, 2000.

* cited by examiner

Primary Examiner—Vivian Chang
Assistant Examiner—Charles N. Appiah
(74) Attorney, Agent, or Firm—Jenkens & Gilchrist, P.C.

(57) ABSTRACT

A telecommunications system and method is disclosed for providing service transparency for mobile terminating calls to a roaming H.323 mobile terminal. An H.323 mobile terminal can be assigned both an office number and a regular Mobile Station Integrated Services Digital Network (MSISDN) number. The MSISDN of the H.323 mobile terminal will not be made available to the H.323 mobile subscriber or to anyone else. The MSISDN will only be used internally within the Public Land Mobile Network (PLMN) and H.323 system to route the call properly. Thus, whenever a call attempt is made to the H.323 mobile terminal, the call shall always be routed to the H.323 Gatekeeper. If the H.323 mobile terminal has roamed outside the H.323 network, the H.323 Gatekeeper can apply mobile terminating services to the incoming call and route the call to the serving PLMN of the H.323 mobile terminal using the H.323 mobile terminal's MSISDN.

14 Claims, 5 Drawing Sheets

SYSTEM AND METHOD FOR PROVIDING SERVICE TRANSPARENCY FOR MOBILE TERMINATING CALLS WITHIN AN H.323 SYSTEM

BACKGROUND OF THE PRESENT INVENTION

1. Field of the Invention

The present invention relates generally to telecommunications systems and methods for implementing an H.323 architecture within a local area network, and specifically to providing service transparency for mobile terminating calls to roaming H.323 mobile terminals.

2. Background and Objects of the Present Invention

Until recently, it has been relatively easy to define Wide Area Networks (WANs) and Local Area Networks (LANs) and to point out their differences. However, it is becoming increasingly difficult to distinguish WANs and LANs because the terms wide area and local area do not have the meaning they once had. For example, a LAN in the 1980s was generally confined to a building or a campus where the components were no more than a few hundred or few thousand feet from each other. Today, LANs may span scores of miles.

Nonetheless, certain characteristics are unique to each of these networks. A WAN is usually furnished by a third party. For example, many WANs are termed public networks because the telephone company or a public data network (PDN) vendor owns and manages the resources and rents these services to users. By contrast, a LAN is usually privately owned. The cables and components are purchased and managed by an enterprise.

The first LANs were proprietary and developed to support unintelligent user workstations in which a primary station controlled the operations of the attached devices (secondary stations). The effectiveness of this technology decreased because the master/slave protocol was too slow and cumbersome. Therefore, new types of LANs were developed, such as Ethernet LANs and token-ring LANs. Ethernet LANs and token-ring LANs are designed for data applications and use a shared medium (bus or ring, respectively) designed for 10 Mbit/s speeds or higher up to Gigbit speeds. However, during periods of high activity, the shared medium does not respond well to all users, which results in degraded response time and throughput. Therefore, Switched Ethernet LANs were developed to provide more capacity to the end users. Switched Ethernet LANs do not rely on sharing the media. Instead, Switched Ethernet LANs provide point-to-point bandwidth between the user station and a switch. Another type of LAN being developed alongside the Switched Ethernet LAN is the Asynchronous Transfer Mode (ATM) based LAN, which utilizes very high-speed ATM switches that support multimedia applications.

On top of these different networking architectures, such as Switched Ethernet or ATM, which define the physical attributes of the communications network, many LANs have begun using Internet Protocol (IP) to route data between hosts on the network. The data is routed in datagrams, hereinafter referred to as packets, and is transmitted using connection-less network services. Therefore, IP does not guarantee the reliable delivery of the data or the sequencing of the packet. Hence, an upper layer, such as Transmission Control Protocol (TCP) or User Datagram Protocol (UDP), must provide this function. TCP connection-oriented services provide reliable delivery of data between the host computers by establishing a connection before the applications send data. Thus, TCP guarantees that the data is error free and in sequence. On the other hand, UDP connection-oriented services are used by various applications to send messages where the integrity of the data is not as important.

Data can be sent across a LAN from an originating host computer to a receiving host computer using the IP routing protocol by encapsulating the data sent by the originating host computer into an IP packet, which includes an IP header. The IP header identifies the address of the receiving host computer. The IP packet and header can then be further encapsulated into the specific protocol of the transit network, such as an Ethernet LAN, for delivery of the IP packet and header to an IP router.

After the transit network has delivered the IP packet and header to the IP router, the IP router strips away the control information and uses the destination address in the packet header to determine where to route the traffic. Typically, the IP router then passes the packet back to the sub-network by invoking a sub-network access protocol, such as Ethernet on the LAN. This protocol is used to encapsulate the packet header and user data into the headers and trailers that are used by the sub-network to deliver the data to the receiving host computer. It should be understood that routers can also be used to transport data to other LANs or WANs.

LANs not only interconnect computers for data communications, but can also interconnect terminals for voice communications. For example, many LANs are now implementing H.323 architecture to provide multimedia communications services over LANs. H.323 entities may be integrated into personal computers or implemented in stand-alone devices, such as wireline or wireless terminals, e.g., video or audio telephones. H.323 entities can provide real-time audio, video and/or data communications capabilities in point-to-point or multipoint conferences.

An H.323 system is shown in FIG. 1 of the drawings. When a first user logs-on to a first H.323 terminal 120, which can be, for example, a personal computer or IP telephone, e.g., by providing a user name and password, a Registration and Admission Control Signaling (RAS) message 115 is sent from the first H.323 terminal 120 to a Gatekeeper 180, which stores an IP routing address 187 within a subscriber record 185 associated with the first user for the first H.323 terminal 120. Thereafter, when a second user on a second H.323 terminal 125 places a call to the first user on the first H.323 terminal 120, e.g., by dialing a telephone number or user ID for the first user, the call is routed over the LAN backbone 110 to the Gatekeeper 180, which retrieves the address 187 for the first H.323 terminal 120 and re-directs the call to the first H.323 terminal 120. When the call connection is established between the first and second H.323 terminals 120 and 125, respectively, IP voice packets are sent between the first and second H.323 terminals 120 and 125, respectively, without necessarily being routed through the Gatekeeper 180. It should be noted that calls can be placed to and from the Public Land Mobile Network (PLMN)/Public Switched Telephone Network (PSTN) 160 through a Public Gateway (PG) 150. IP voice packets are sent between one of terminals 120 or 125 and the PG 150 before being converted into the PLMN/PSTN 160 format.

If, however, as shown in FIG. 2 of the drawings, the H.323 terminal 120 is a mobile terminal, such as a cellular telephone, the H.323 mobile terminal 120 can log-on to the H.323 network 100 through a cellular network 190 within the H.323 network 100 by providing, for example, an International Mobile Subscriber Identity (IMSI) number 122 uniquely identifying the mobile subscriber. The mobile communications system 190, which can itself be considered an H.323 terminal, includes an Access Node (AN) 130, which combines a part of a Mobile Switching Center (MSC) functionality 134 for handling mobility management and controlling calls made to and from H.323 mobile terminals 120 within the H.323 network 100 and a Base Station Controller (BSC) functionality 132 for controlling radio-related functions, such as channel assignment, and at least one A-bis Gateway 142 and associated BTS 140, all of which are connected to the LAN backbone 110. It should be noted that the BTS 140 is connected to the LAN backbone 110 via the A-bis Gateway 142. The A-bis Gateway 142 converts between circuit-switched signaling used by the BTS 140 and packet-switched signaling used by the H.323 network 100. The BTS 140 operates as a transceiver for transmitting and receiving data and control messages to and from the MS 120 over an air interface 146.

Wireless voice communications are transported through the LAN backbone 110 between A-bis Gateways 142, between an A-bis Gateway 142 and the PG 150 or between an A-bis Gateway 142 and another H.323 terminal (120 or 125 shown in FIG. 1 of the drawings) via UDP/IP. As stated hereinbefore, the PG 150 provides the interconnection between the packet based H.323 network 100 and the circuit switched public telephone network, e.g., PLMN/PSTN 160. Speech and data are transmitted within the H.323 network 100 and through the Internet 175 using an IP Router 170.

The cellular network 190 within the H.323 network 100 may also include a Home Location Register (HLR) 155 for storing location information of the H.323 mobile terminals 120, and non-H.323 network 100 related subscriber information associated with the H.323 mobile terminals 120 belonging to the H.323 network 100. However, all of the permanent H.323 subscriber information relating to services offered to the subscribers belonging to the H.323 network 100 are stored within the Gatekeeper 180, which also is responsible for determining whether an H.323 subscriber is currently within the H.323 network 100. For example, the H.323 network 100 may offer a call forwarding service to subscribers, some of which may subscribe to the service. Thus, the H.323 network 100 operator can provide uniquely tailored service to each of the subscribers registered within the H.323 network 100.

However, with reference now to FIG. 3 of the drawings, when an H.323 mobile terminal 120 having it's subscriber services 188 stored within a subscriber record 185 associated with the H.323 mobile terminal 120 within the Gatekeeper 180 of the H.323 network 100 roams into a PLMN 160 outside of the H.323 network 100, the H.323 mobile terminal 120 performs a location update 125 to an MSC 165 serving the PLMN 160 that the H.323 mobile terminal 120 is located in. The serving MSC 165 transmits a location update message 125, along with an address 166 for the serving MSC 165, to the HLR 155 associated with the H.323 mobile terminal 120. The HLR 155 stores this serving MSC address 166 within a subscriber record 158 associated with the H.323 mobile terminal 120 within the HLR 155 and forwards subscriber information 159 associated with the H.323 mobile terminal 120 to the serving MSC 165.

However, since the permanent H.323 subscriber information 188 relating to services offered to the subscribers registered with the H.323 network 100 are stored within the Gatekeeper 180, the serving MSC 165 does not receive this permanent H.323 subscriber information 188. In this case, the HLR 155 is shown within the H.323 network 100. However, it should be noted that the HLR 155 could be located outside of the H.323 network 100.

Therefore, when an incoming call to a roaming H.323 mobile terminal 120 is received from a subscriber inside the H.323 network 100 or outside the H.323 network 100, the latter being illustrated, there is currently no mechanism for allowing the Gatekeeper 180 within the H.323 network 100 to communicate with the serving MSC 165 to inform the serving MSC 165 of the permanent H.323 subscriber services 188, such as the call terminating services 188 subscribed to by the H.323 mobile terminal 120. Such call terminating services 188 can include, for example, call forwarding, call blocking or caller ID. Consequently, the call terminating services 188 associated with the H.323 mobile terminal 120 cannot be provided to the H.323 mobile terminal 120.

It is, therefore, an object of the present invention to provide service transparency for mobile terminating calls to roaming H.323 mobile terminals.

SUMMARY OF THE INVENTION

The present invention is directed to telecommunications systems and methods for providing service transparency for mobile terminating calls to a roaming H.323 mobile terminal. An H.323 mobile terminal can be assigned both an office number and a regular Mobile Station Integrated Services Digital Network (MSISDN) number. The MSISDN of the H.323 mobile terminal will not be made available to the H.323 mobile subscriber or to anyone else. The MSISDN cannot be dialed to reach the H.323 mobile terminal. Instead, the H.323 mobile terminal can only be reached by dialing the office number. The MSISDN will only be used internally within the PLMN and H.323 system to route the call properly. Thus, whenever a call attempt is made to the H.323 mobile terminal, the call shall always be routed to the H.323 Gatekeeper. If the H.323 mobile terminal is registered within the H.323 network, the call can be delivered to the H.323 mobile terminal from the H.323 Gatekeeper, as normal. However, if the H.323 mobile terminal has roamed outside the H.323 network, the H.323 gatekeeper can apply mobile terminating services associated with the H.323 mobile terminal, and route the call to the serving PLMN of the H.323 mobile terminal using the H.323 mobile terminal's MSISDN. If the call cannot be completed in the serving PLMN, the call drops back to the H.323 network and the H.323 Gatekeeper can again apply mobile terminating services that may be applicable.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
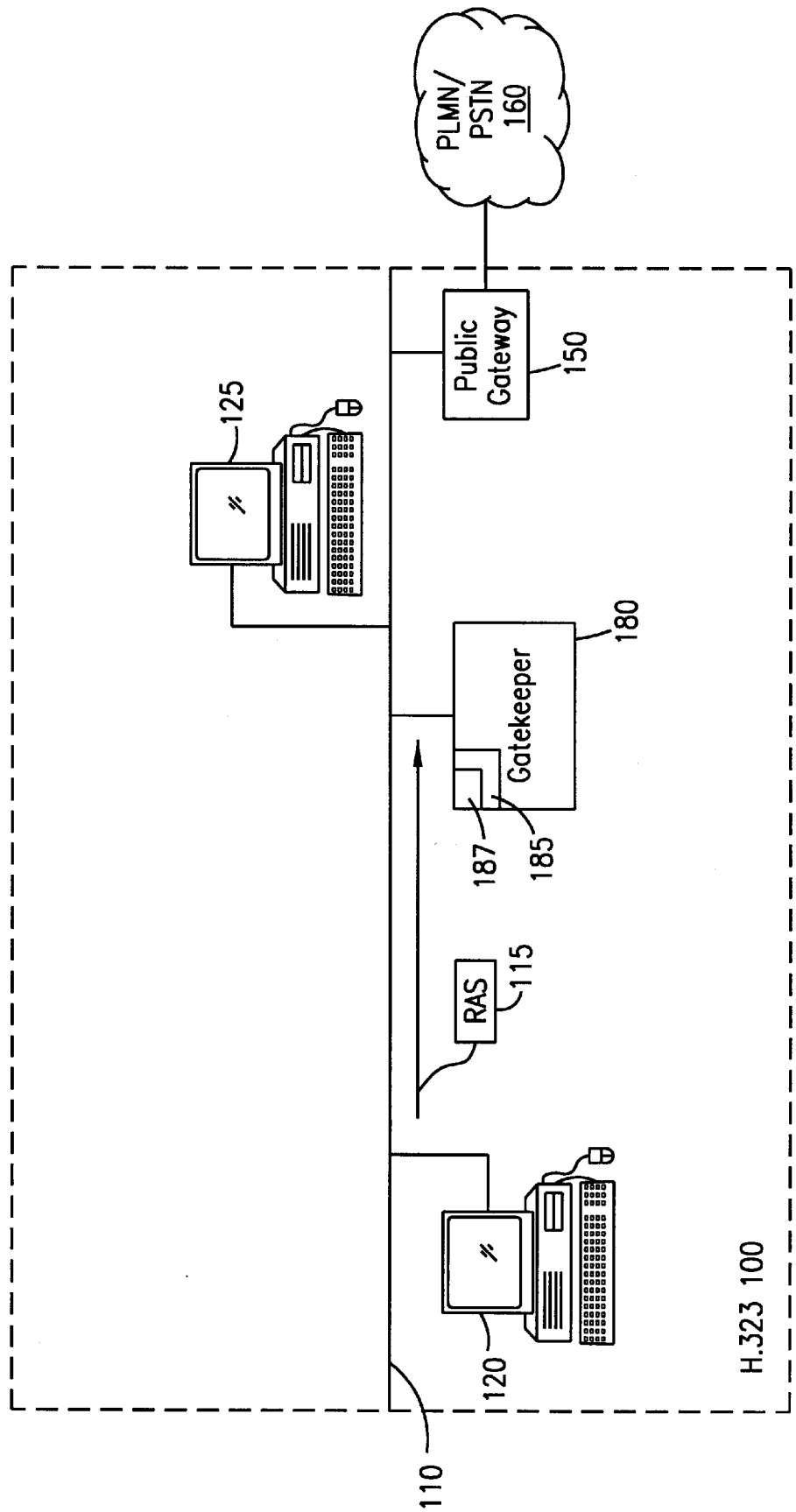
FIG. 1 is a block diagram of components in an H.323 local area network based upon internet protocol.
Figure 2:
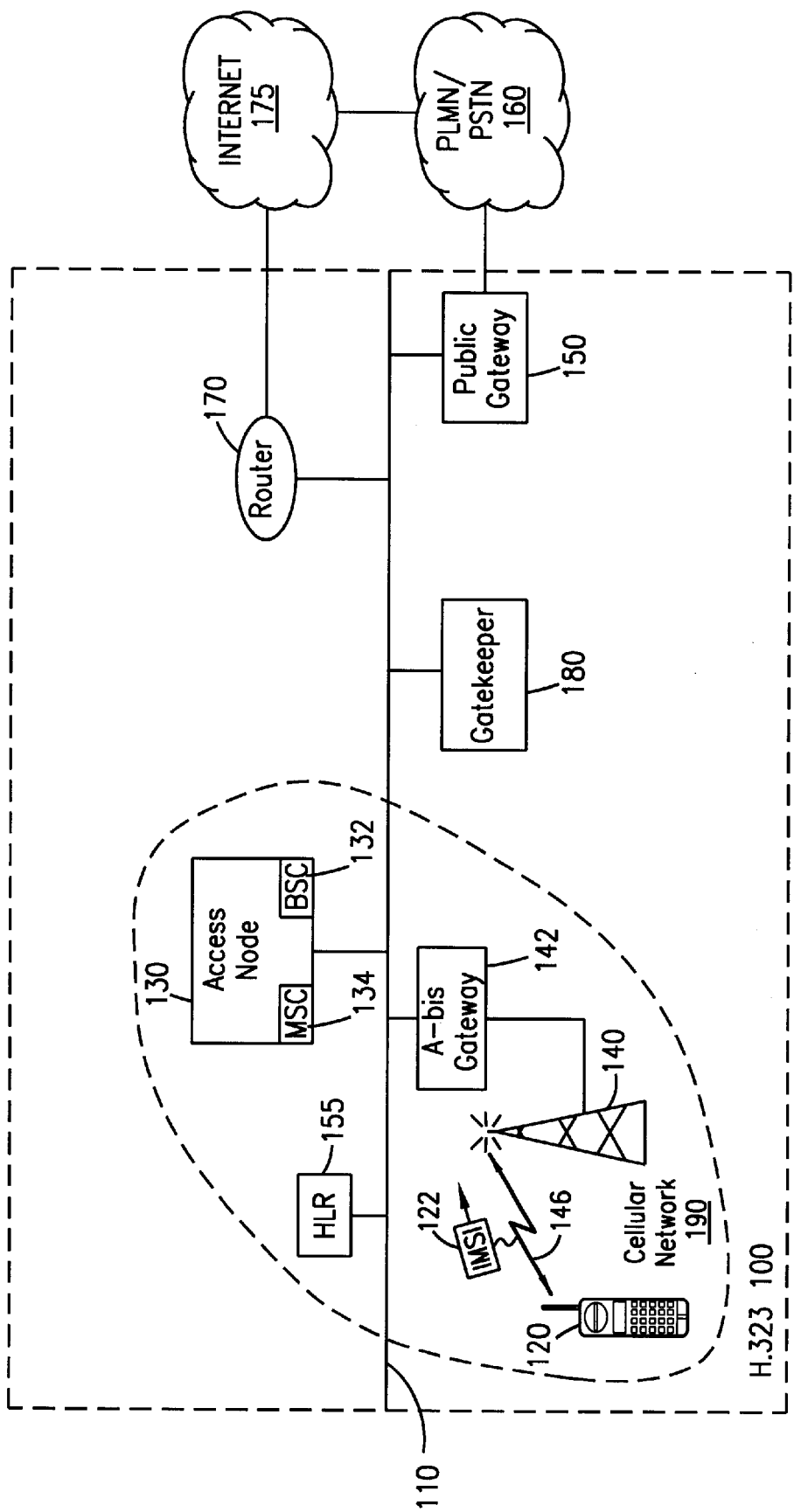
FIG. 2 is a block diagram of components in an H.323 local area network based upon internet protocol that provides mobile communications.
Figure 3:
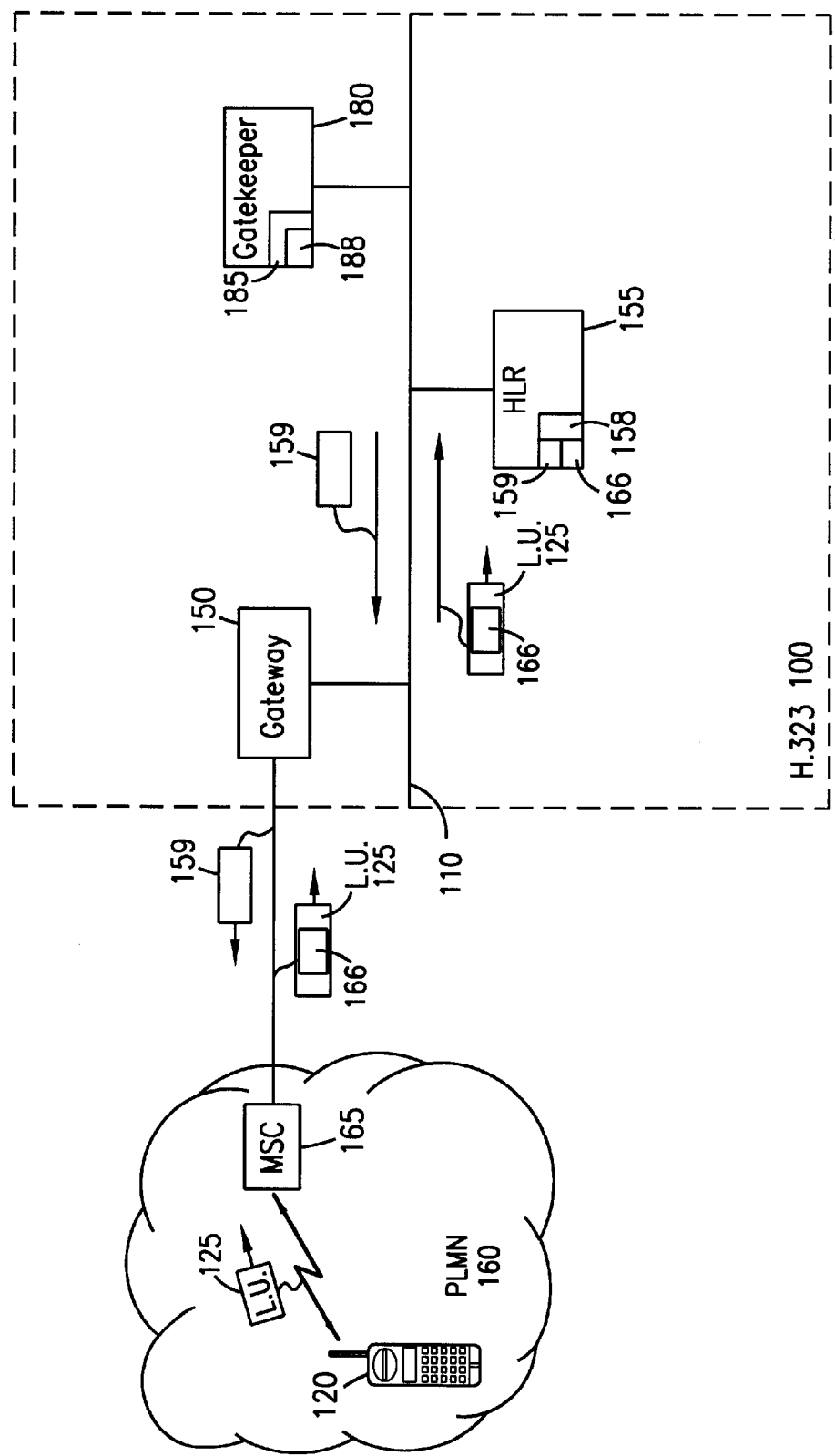
FIG. 3 illustrates the problem of providing subscriber services for a mobile terminating call to a roaming H.323 mobile terminal.
Figure 4:
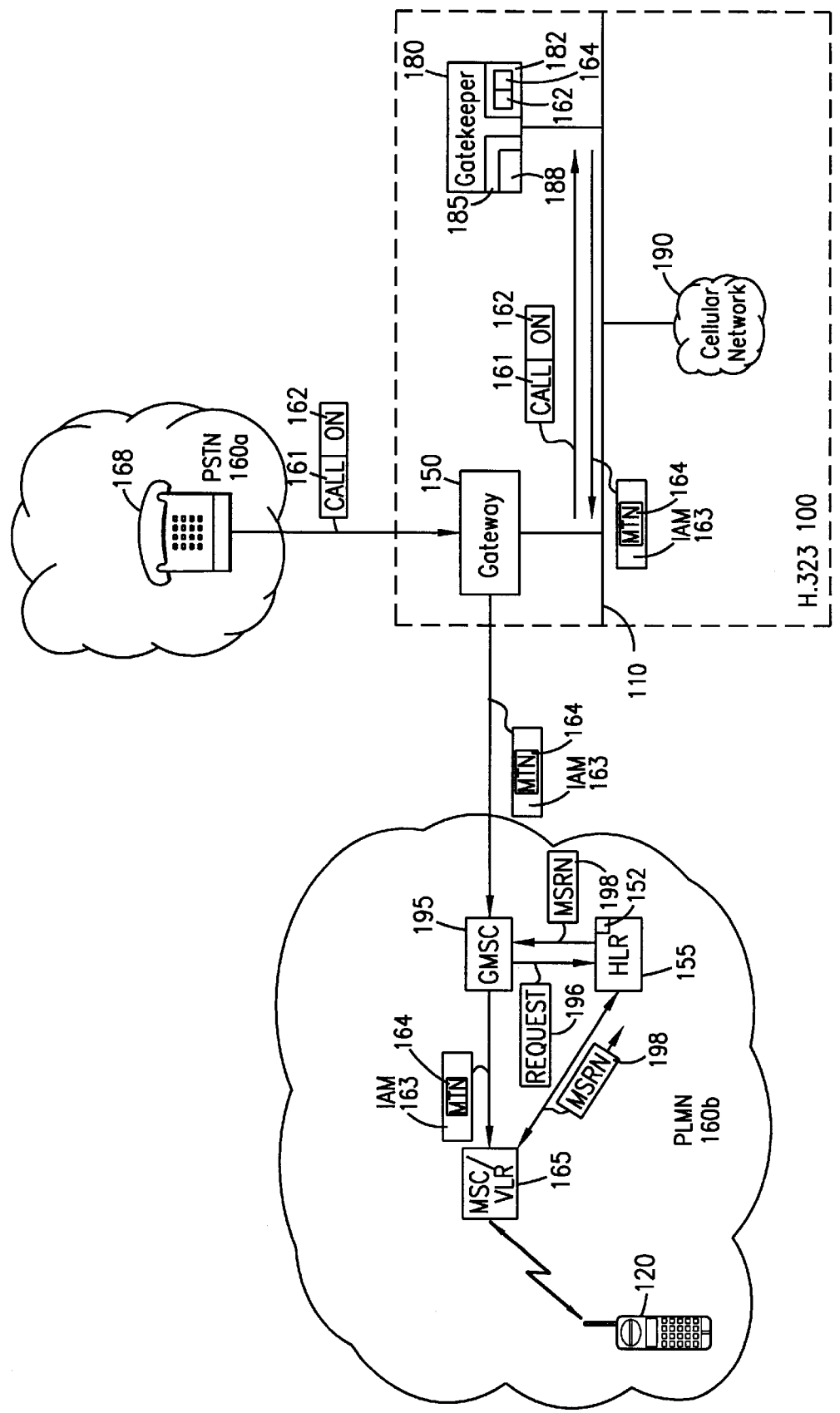
FIG. 4 illustrates the routing of an incoming call from a subscriber outside an H.323 network to a roaming H.323 mobile terminal in order to provide service transparency for mobile terminating services associated with the called H.323 mobile terminal in accordance with preferred embodiments of the present invention.

With reference now to FIG. 4 of the drawings, service transparency for a mobile terminating call 161 from a subscriber 168 inside or outside an H.323 network 100, the latter being illustrated, to a roaming H.323 mobile terminal 120 can be provided by assigning an office number 162 in addition to a mobile terminal identity number 164, e.g., a Mobile Station Integrated Services Digital Network (MSISDN) number, to the H.323 mobile terminal 120. Within, for example, a Global System for Mobile Communications (GSM) Public Land Mobile Network (PLMN), a mobile terminal is addressed by it's MSISDN. Therefore, when a calling subscriber (fixed or mobile) places a call to the mobile terminal, the calling subscriber dials the MSISDN of the mobile terminal. The call is routed to the PLMN that the mobile subscriber is currently located in, which directs the call towards the mobile terminal.

With the introduction of GSM access in the H.323 network 100, the H.323 mobile terminal 120 can be accessed either from a subscriber (not shown) within the H.323 network 100 or from a subscriber 168 outside the H.323 network 100. If the calling subscriber 168 is outside the H.323 network 100, as is shown in FIG. 4 of the drawings, an E.164 numbering scheme needs to be used. That E.164 number can be the MSISDN 164 of the H.323 mobile terminal 120. However, using the MSISDN 164 as the number for addressing the H.323 mobile terminal 120 does not guarantee that the call 161 will be controlled by the H.323 network 100. For example, as discussed hereinbefore, when the H.323 mobile terminal 120 has roamed outside the H.323 network 100 into the PLMN 160b, a call to the H.323 mobile terminal 120 is never seen by the H.323 network 100. Thus, terminating services 188 for the H.323 mobile terminal 120 cannot be controlled by the H.323 network 100.

Therefore, by allocating an office number 162 to the H.323 mobile terminal 120 that addresses the H.323 network 100, all incoming calls 161 to the H.323 mobile terminal 120 can be routed through the H.323 network 100. The MSISDN 164 of the H.323 mobile terminal 120 will not be made available by the H.323 network 100 to the H.323 mobile subscriber or to anyone else. Thus, in order to reach the H.323 mobile terminal 120, the calling subscriber 168 must dial the office number 162, instead of the MSISDN 164. The MSISDN 164 will only be used internally within the PLMN 160b and the H.323 network 100 to route the call 161 properly. It should be noted that internally within the H.323 system 100, any alias for the H.323 mobile terminal 120 can be used to address the H.323 mobile terminal 120 instead of the office number 162 discussed herein.

Figure 5:
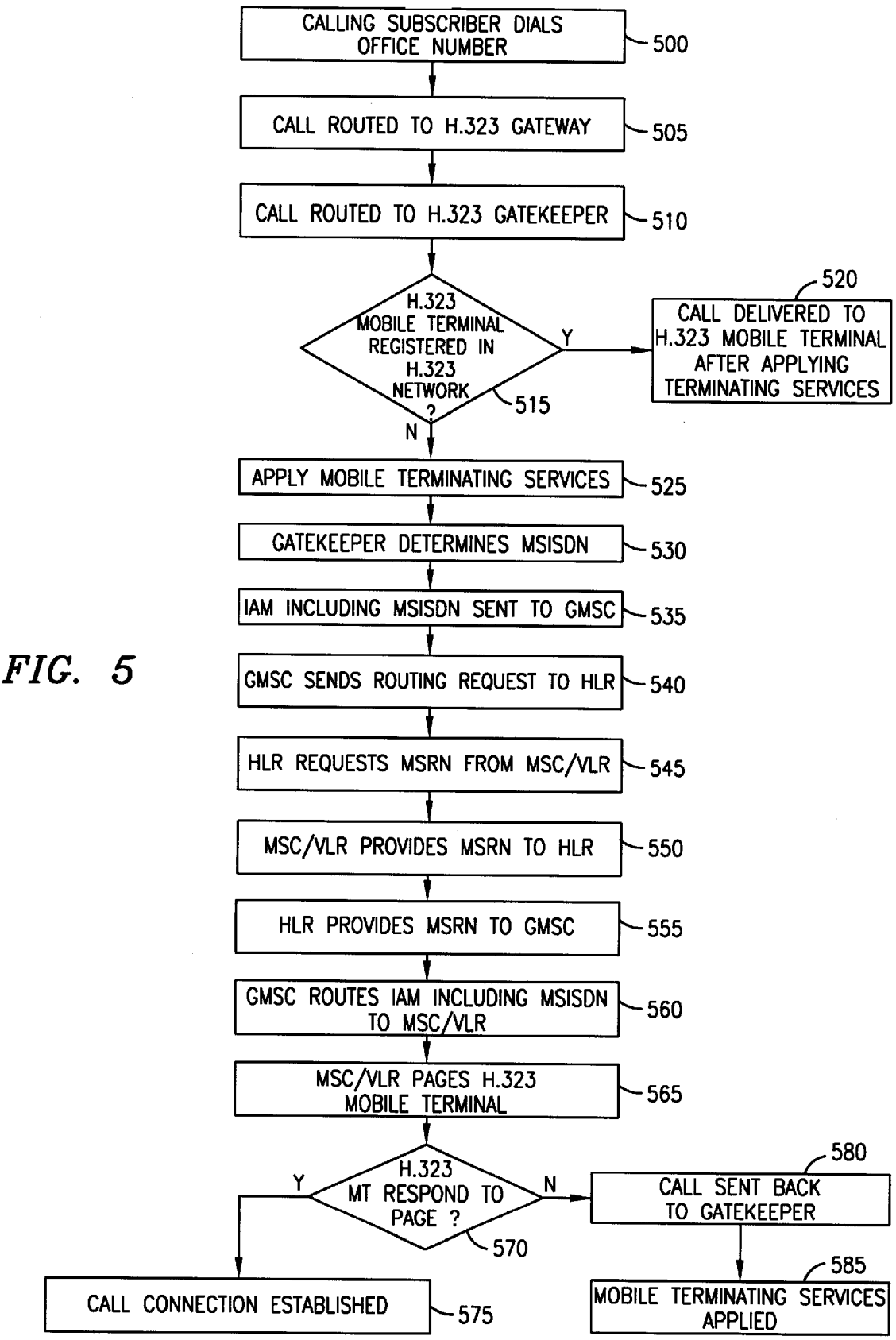
FIG. 5 is a flow diagram illustrating a sample implementation of the routing procedure shown in FIG. 4 of the drawings.

Therefore, with reference now to the steps listed in FIG. 5 of the drawings, which will be discussed in connection with FIG. 4 of the drawings, in order for a call 161 to be placed to the H.323 mobile terminal 120 from a calling subscriber 168 outside the H.323 network 100, e.g., within the PLMN 160b or PSTN 160a, the latter being illustrated, the calling subscriber 168 must dial the office number 162 associated with the H.323 mobile terminal 120 (step 500). This office number 162 is used as the E.164 address of the H.323 network 100 in order to route the call 161 to an H.323 Gateway 150 within the H.323 network 100 (step 505). When the H.323 Gateway 150 receives the incoming call 161 to the office number 162 (step 505), the H.323 Gateway 150 forwards the call 161 and office number 162 to an H.323 Gatekeeper 180 (step 510), using H.225 call control signaling (Q.931).

If the H.323 mobile terminal 120 is registered within the H.323 network 100 (step 515), the H.323 Gatekeeper 180 can apply mobile terminating services 188, e.g., call forwarding or call blocking, associated with the called H.323 mobile terminal 120. Thereafter, either because no terminating services 188 can be applied at that time or as a result of applying the terminating services 188, the call 161 may still need be delivered to the H.323 mobile terminal from the H.323 Gatekeeper 180 (step 520), as is normally done by using H.225 call control signaling over a Local Area Network (LAN) backbone 110, which interconnects the H.323 Gatekeeper 180 with the H.323 cellular network 190.

However, if the H.323 mobile terminal 120 has roamed outside the H.323 network 100 into the PLMN 160b (step 515), as shown in FIG. 4, the H.323 Gatekeeper 180 can apply the mobile terminating services 188 stored within a subscriber record 185 associated with the H.323 mobile terminal 120 within the H.323 Gatekeeper 180 (step 525). Either because no mobile terminating services 188 apply to the incoming call 161 at that time or as a result of applying the mobile terminating services 188, the H.323 Gatekeeper 180 can access a table 182 therein to cross-reference the office number 162 with the MSISDN 164 of the called H.323 mobile terminal 120 (step 530).

When the H.323 Gatekeeper 180 determines the MSISDN 164 (step 530), the H.323 Gatekeeper 180 sends an Initial Address Message (IAM) 163 including the MSISDN 164, to a Gateway Mobile Switching Center (GMSC) 195 within the PLMN 160b via the H.323 Gateway 150 (step 535). When the GMSC 195 receives the IAM 163 including the MSISDN 164 (step 535), the GMSC 195 sends a request 196 for routing information to a Home Location Register (HLR) 155 associated with the H.323 mobile terminal 120, using the MSISDN 164 as global title (step 540). It should be understood that although the HLR 155 is shown outside the H.323 network 100, in alternative embodiments, the HLR 155 could be located within the H.323 network 100.

In response to the routing request 196 (step 540), the HLR 155 accesses the H.323 mobile terminal's subscriber record 152 stored in the HLR 155 to determine a Mobile Switching Center/Visitor Location Register (MSC/VLR) 165 currently serving the H.323 mobile terminal 120. The HLR 155 requests a roaming number 198, e.g., a Mobile Station Roaming Number (MSRN), which identifies the serving MSC/VLR 165, from the serving MSC/VLR 165 (step 545). The serving MSC/VLR 165 returns this MSRN 198 to the HLR 155 (step 550), which in turn, returns the MSRN 198 to the GMSC 195 (step 555) for use in routing the IAM 163 including the MSISDN 164 to the serving MSC/VLR 165 (step 560). When the MSC/VLR 165 receives the IAM 163 including the MSISDN 164 (step 560), the MSC/VLR 165 pages the H.323 mobile terminal 120 (step 565), and if the H.323 mobile terminal 120 responds to the page (step 570), establishes a call connection between the calling subscriber 168 and the H.323 mobile terminal 120 (step 575).

If the H.323 mobile terminal 120 does not respond to the page (step 570), the serving MSC/VLR 165 can return the call to the H.323 Gatekeeper 180 (step 580) via the GMSC 195 and the Public Gateway 150. The H.323 Gatekeeper 180 can apply additional mobile terminating services 188 for the call 161 at this time (step 585). For example, the H.323 mobile subscriber 120 could subscribe to a voice mail service, and the H.323 Gatekeeper 180 could establish a call connection with the voice mail system (not shown) associated with the H.323 mobile terminal 120 using the mobile terminating service information 188.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for routing an incoming call to an H.323 mobile terminal associated with an H.323 network, said H.323 mobile terminal roaming in an additional network, comprising:

an H.323 Gatekeeper within said H.323 network for receiving said incoming call from a calling subscriber, the calling subscriber dialing an office number associated with both said H.323 mobile terminal and said H.323 network to place said incoming call, said office number directly addressing said H.323 network, said H.323 Gatekeeper applying a first set of mobile terminating services associated with said H.323 mobile terminal, converting said office number into a mobile station identity number associated with said H.323 mobile terminal and routing said incoming call to said H.323 mobile terminal using said mobile station identity number, said H.323 Gatekeeper further applying a second set of mobile terminating services associated with said H.323 mobile terminal to said incoming call when said incoming call cannot be connected to said H.323 mobile terminal within said additional network; and an H.323 Gateway within said H.323 network for forwarding said incoming call to said H.323 mobile terminal within said additional network.

2. The telecommunications system of claim 1, further comprising:

a table within said H.323 Gatekeeper for cross-referencing said office number with said mobile station identity number.

3. The telecommunications system of claim 1, wherein said mobile station identity number is a Mobile Station Integrated Services Digital Network Number.

4. The telecommunications system of claim 1, further comprising:

a gateway mobile switching center within a Public Land Mobile Network not associated with said H.323 network, said H.323 Gatekeeper forwarding said incoming call, including said mobile station identity number, to said gateway mobile switching center.

5. The telecommunications system of claim 4, further comprising:

a home location register having a second subscriber record associated with said H.323 mobile terminal therein for storing routing information for said H.323 mobile terminal, said home location register sending said routing information to said gateway mobile switching center.

6. The telecommunications system of claim 5, wherein said home location register is located within said Public Land Mobile Network.

7. The telecommunications system of claim 5, wherein said home location register is located within said H.323 network.

8. The telecommunications system of claim 5, further comprising:

a serving mobile switching center in wireless communication with said H.323 mobile terminal, said routing information being an address for said serving mobile switching center, said gateway mobile switching center forwarding said incoming call to said serving mobile switching center using said address, said serving mobile switching center attempting to establish a call connection with said H.323 mobile terminal.

9. A method for routing an incoming call to an H.323 mobile terminal associated with an H.323 network, said H.323 mobile terminal roaming in an additional network, comprising the steps of:

dialing, by a calling subscriber, an office number associated with both said H.323 mobile terminal and said H.323 network to place said incoming call, said office number directly addressing said H.323 network;

receiving said incoming call by an H.323 Gatekeeper within said H.323 network;

applying, by said H.323 Gatekeeper, a first set of mobile terminating services associated with said H.323 mobile terminal for said incoming call;

converting, by said H.323 Gatekeeper, said office number into a mobile station identity number associated with said H.323 mobile terminal;

routing said incoming call from said H.323 Gatekeeper to said H.323 mobile terminal using said mobile station identity number; and applying, by said H.323 Gatekeeper, a second set of mobile terminating services to said incoming call when said call cannot be connected to said H.323 mobile terminal within said additional network.

10. The method of claim 9, wherein said step of receiving further comprises the steps of:

receiving, by an H.323 Gateway within said H.323 network, said incoming call directed to said office number from said calling subscriber outside said H.323 network; and routing said incoming call from said H.323 Gateway to said H.323 Gatekeeper.

11. The method of claim 9, wherein said step of converting further comprises the step of:

accessing a table within said H.323 Gatekeeper to cross-reference said office number with said mobile station identity number.

12. The method of claim 9, wherein said step of routing further comprises the step of:

forwarding said incoming call including said mobile station identity number from said H.323 Gatekeeper to a gateway mobile switching center within a Public Land Mobile Network not associated with said H.323 network.

13. The method of claim 12, wherein said step of routing further comprises the steps of:

sending a request for routing information for said H.323 mobile terminal from said gateway mobile switching center to a home location register having a second subscriber record associated with said H.323 mobile terminal therein for storing said routing information for said H.323 mobile terminal, using said mobile station identity number;

retrieving, by said home location register, said routing information associated with said H.323 mobile terminal; and sending said routing information from said home location register to said gateway mobile switching center.

14. The method of claim 13, wherein said step of routing further comprises the step of:

routing said incoming call including said mobile station identity from said gateway mobile switching center to a serving mobile switching center in wireless communication with said H.323 mobile terminal, using said routing information; and attempting to establish, by said serving mobile switching center, a call connection with said H.323 mobile terminal.

* * * * *